April 8, 1930. G. C. DEBAY 1,753,405
APPARATUS FOR MOLDING PLASTIC BLOCKS AND THE LIKE
Filed June 8, 1927 3 Sheets-Sheet 3

INVENTOR.
George C. Debay,
BY
ATTORNEY.

Patented Apr. 8, 1930

1,753,405

UNITED STATES PATENT OFFICE

GEORGE C. DEBAY, OF LOS ANGELES, CALIFORNIA

APPARATUS FOR MOLDING PLASTIC BLOCKS AND THE LIKE

Application filed June 8, 1927. Serial No. 197,346.

This invention relates to the manufacture of blocks, pipe and the like from plastic material and has for its object to supply the plastic material to a mold in a thoroughly wet condition and to expedite the molding operation and the subsequent removal of the finished product.

More particularly it is an object of the invention to arrange the mold with relation to the mixing trough so that the mixed material is discharged directly into the mold, thereby permitting the plastic material being supplied to the mold in a thoroughly wet condition such as is most adaptable to proper settling of the aggregate and formation of blocks, etc., of the desired consistency.

It is a further object of the invention to create suction in the wet plastic material which is preferably completely enclosed in the mold, thereby withdrawing the major portion of the fluid from the plastic mix; and to then subject the material in the enclosing mold to pressure for quickly forming the block, with the withdrawal of fluid eliminating resistance to the pressure application so as to properly settle and unite the aggregate by the use of minimum pressure, and also tending to quickly dry the blocks and thus expedite the formation of the finished product.

It is a still further object of the invention to provide the apparatus with a movable mold adapted for shifting to position for receiving the wet plastic material directly from the mixing trough, and then adapted for reverse shifting to withdraw the mold from the block or the like which is formed, so that the block may be quickly removed to permit immediate repetition of the operation.

It is a still further object of the invention to provide a base for the mold adapted to support the block when the mold is withdrawn and adapted to then tilt so as to displace the block and permit its readily sliding clear of the apparatus.

Further objects of the invention will be readily understood from the following description of the accompanying drawings, showing a preferred embodiment of the apparatus:

Figure 1:
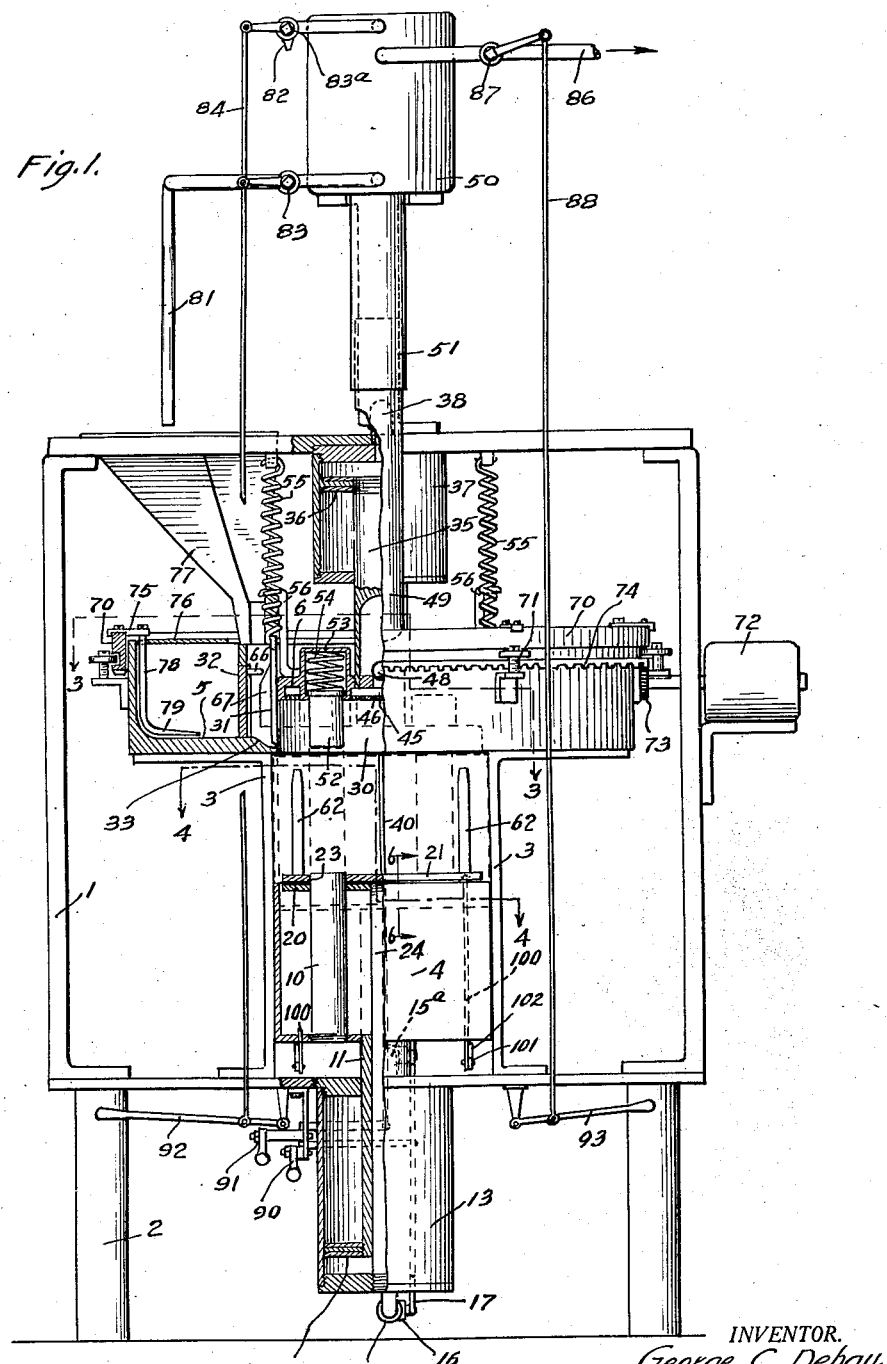
Fig. 1 is a front elevation of the machine partly in axial section.
Figure 2:
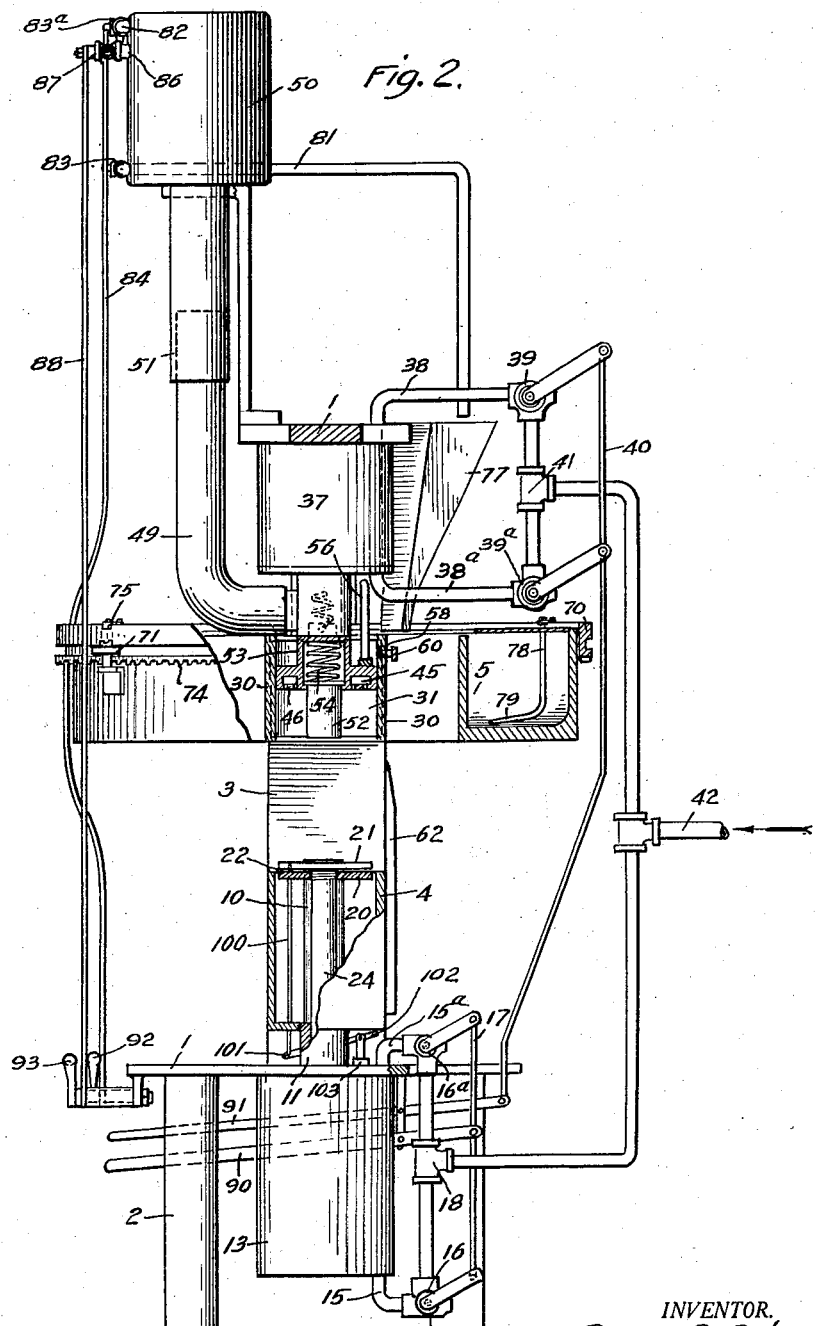
Fig. 2 is a side elevation partly in axial section.
Figure 3:
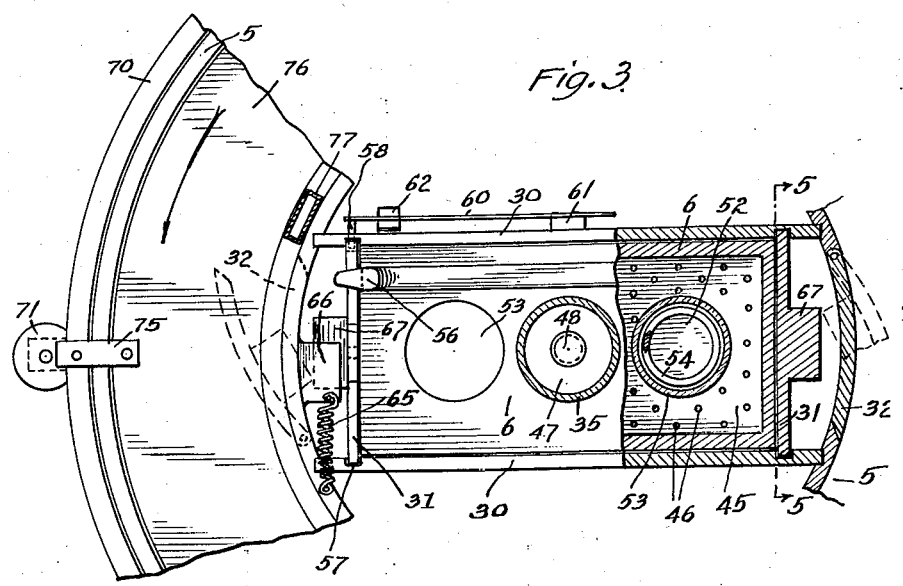
Figure 4:
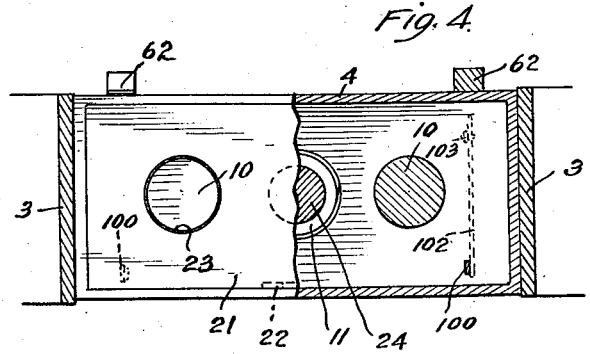

Figs. 3 and 4 are transverse sections on the lines 3—3 and 4—4 of Fig. 1.

Figure 5:
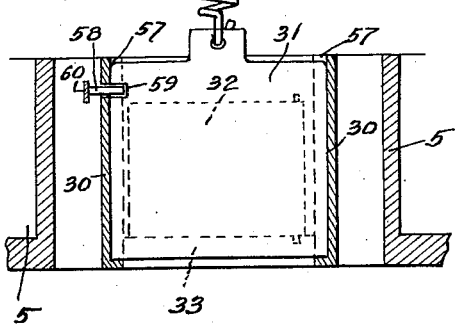

Fig. 5 is a vertical section on the line 5—5 of Fig. 3.

Figure 6:
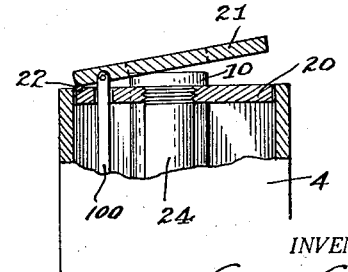

Fig. 6 is a vertical section on the line 6—6 of Fig. 1.

In the drawings I have shown the apparatus as including a rectangular upright frame 1 adapted to support the operating mechanism, with the frame 1 preferably mounted on suitable legs 2. Transversely spaced upright side plates 3 mounted on the base of frame 1 form a guide for the enclosing mold box 4, and at their upper ends these side plates support an annular mixing trough 5 for wet plastic material. A pressure plate 6 is vertically slidable in the central opening formed by the annular trough and is adapted to exert pressure upon a plastic mixture from which its fluid ingredients have been withdrawn as will be hereinafter described.

The mold box 4 is open at its top for reception of wet plastic material and is of a shape conforming to the block, pipe, or the like which it is desired to manufacture. If the article to be manufactured, hereinafter referred to as a block, is to have openings vertically therethrough or is to be divided into a plurality of smaller blocks or bricks, suitable upright cores or partitions may be provided in the mold box, and for this purpose cylindrical cores 10 are shown projecting upwardly from the base of the mold box adjacent the respective ends thereof.

The mold box is adapted for vertical movement in its guides 3 by mounting the box on a piston rod 11, which at its lower end carries a piston 12 working in a cylinder 13 depending from the frame 1. An actuating medium, compressed air for example, may be introduced into the cylinder at the respective sides of the piston for raising and lowering the mold box, the compressed air being supplied through conduits 15 and 15ª having valvular controls 16 and 16ª provided with a common actuating means 17 arranged whereby its movement in opposite directions will open one or the other of the valves to a supply conduit 18 and at the same time close the opposite valve to the supply conduit and permit exhaust therefrom to the atmosphere.

The mold box is provided with a false bottom 20 which is held stationary while the mold box is raised and lowered, and a tilting plate 21 adapted to support the molded block is hinged to the false bottom as shown at 22, the false bottom and the tilting plate having openings 23 in alinement with cores 10 to permit projection of the latter when the mold box is elevated. The false bottom may be supported on a rod 24 extending through piston rod 11 which is of hollow construction, and the lower end of the supporting rod may be mounted on the base of cylinder 13, the parts being so arranged that when the mold box is in lowered position as show in full lines in Fig. 1, the tilting plate 21 is just above the open top of the mold box, and when the mold box is elevated to position immediately below the mixing trough as shown in dotted lines in Fig. 1, the tilting plate forms the bottom of the mold.

An enclosed space forming a vertical prolongation of the interior of the mold box is formed in the central opening defined by the annular trough 5, for which purpose a pair of transversely spaced upright walls 30 extend across the central opening in vertical alinement with the front and rear walls of the mold box and are connected at their ends to the inner peripheral wall of trough 5, and vertically sliding gates 31 in vertical alinement with the end walls of the mold box connect the transversely spaced upright walls. Swinging gates 32 are provided in the inner peripheral wall of trough 5 between the transversely spaced walls 30, and lips project from the base of the trough between the walls 30 and extend to the gates 31 so as to form chutes 33 for discharging wet mixed material through open gates 31 and into the enclosed space formed by walls 30 when gates 32 are opened.

The pressure plate 6 is snugly slidable in the enclosed space defined by walls 30 and gates 31, and may be operated by a piston rod 35 which carries a piston 36 working in a cylinder 37 depending from the top of frame 1. The piston may be reciprocated by compressed air in manner similar to that described for the actuation of piston 12, for which purpose conduits 38 and 38ª may open into the respective ends of cylinder 37, with valvular controls 39 and 39ª for these conduits controlled by a common actuating means 40 arranged whereby its movement in opposite directions will open one or the other of the valves to a supply conduit 41 and at the same time close the opposite valve to the supply conduit and permit exhaust therefrom to the atmosphere. The supply conduits 18 and 41 may receive compressed air or other motive fluid from a common source of supply indicated at 42.

The pressure plate 6 is a hollow structure forming a suction chamber 45 having filtering apertures 46 opening through its base, and the suction chamber is shown as communicating with a conduit 47 preferably formed in piston rod 35, with a check valve 48 closing the suction chamber against back flow from the conduit. The conduit 47 preferably leads to a pipe 49 which projects from piston rod 35, and this pipe is connected to a vacuum chamber 50 by means of a telescopic joint 51 which permits of the pressure plate and its associated parts being raised and lowered with relation to the vacuum chamber.

The pressure plate preferably carries depending members in alinement with the cores or partitions in the mold box, and in the apparatus illustrated which includes the cores 10, the alined depending members of the pressure plate are shown as cores 52 slidable in guide bores 53 which extend through the pressure plate. The cores 52 are yieldably projected by springs 54, the parts being so arranged that when the mold box is elevated with relation to the elevated pressure plate, the cores 52 projected by their springs engage the cores 10, and when the pressure plate is lowered relative to the elevated mold box as shown in dotted lines in Fig. 1, the cores 52 yieldably maintain engagement with cores 10 but are retracted in their guides 53 so as to permit downward movement of the pressure plate.

The gates 31 are provided with springs 55 tending to open the gates, and the gates are closed against the action of their springs by fingers 56 on plate 6 adapted to engage and lower the gates as the pressure plate is lowered. The gates are guided in grooves 57 in the spaced walls 30, and may be locked in lowered closed position by pins 58 projecting through the rear one of the walls 30 and adapted to seat in notches 59 in the gates. The pins 58 are mounted on opposite ends of a spring strip 60 which is medially fixed to wall 30 as shown at 61, so that the respective ends of the spring strips are spaced from the wall 30 as shown in Fig. 3, and cam fingers 62 which project upwardly from the rear wall of the mold box are adapted to slide upwardly in back of the respective ends of the spring strip when the mold box is elevated, in order to swing the ends of the spring strip outwardly and thereby disengage locking pins 58 to permit opening of gates 31 by their springs 55.

The swinging gates 32 which control discharge from trough 5 into chutes 33, open into the trough in the same circumferential direction as shown in dotted lines in Fig. 3 and are normally closed by springs 65, but are adapted to be opened by movement of the gates 31 to open position.

For this purpose arms 66 project from the swinging gates 32 toward the sliding gates 31, and cams 67 on the sliding gates are so positioned as to lie in inoperative position below the arms 66 when gates 31 are closed, thereby permitting closing of gates 32 by their springs 65, but are adapted to engage arms 66 when gates 31 are raised to open position, thereby swinging the gates 32 to open position and holding them open until subsequent relowering and closing of gates 31.

The stationary trough 5 is provided with movable means for thoroughly mixing the ingredients of the plastic material, and for this purpose an annular rim 70 journaled in bearings 71 is adapted to revolve on the outer peripheral wall of the trough, revolution of the rim being accomplished by suitable power means shown as an electric motor 72 mounted on frame 1 and having a pinion 73 on its drive shaft meshing with a gear 74 on the annular rim. Radial arms 75 on the rotatable rim project inwardly over the outer peripheral wall of trough 5 and support a cover 76 for the trough, the inner periphery of the cover being spaced from the inner peripheral wall of the trough to permit a hopper 77 which is supported by frame 1 to discharge into the mixing trough.

The arms 75 also support depending rods 78 which extend downwardly into the mixing trough adjacent its outer peripheral wall, and fingers 79 on the lower ends of these depending rods project radially across the trough just above its base. Rotation of rim 70 thus causes the fingers 79 to thoroughly agitate and mix the ingredients of the plastic material supplied to the mixing trough from hopper 77, the fingers 79 moving the ingredients around the annular trough for thorough mixing, and by their positioning at the base of the trough directly engaging the heavier ingredients which tend to sink and thereby positively agitating the same and causing a complete and intimate mixture.

The plastic mixture in trough 5 is in a thoroughly wet condition, the necessary water being supplied through hopper 77 along with the dry ingredients, and the water in the wet mixture in the mold is filtered out along with any finer particles of solid ingredients which pass through the filtering medium, and such liquid and solid ingredients are drawn into vacuum chamber 50 and are then preferably returned to the hopper 77 for re-use in making the plastic mixture. For this purpose a conduit 81 leads from the base of the vacuum chamber 50 to the hopper 77 and the vacuum chamber is also provided with a port 82 opening to the atmosphere so as to permit drainage from the vacuum chamber, the conduit 81 and port 82 being controlled by valves 83 and 83ª with a common actuating means 84 movable in opposite directions to dependently open and close the valve. A vacuum may be created in chamber 50 through a pipe 86 leading to a suitable vacuum creating means (not shown), the pipe 86 being controlled by a valve 87 which is opened and closed by reverse movement of an actuating means 88, and the chamber 50 being suitably arranged to trap the liquid drawn into the chamber by the vacuum so that the liquid may be subsequently returned to hopper 77 through conduit 81.

The position of the apparatus ready to manufacture blocks is shown in full lines in Fig. 1, the mold box being lowered and the pressure plate elevated, with gates 31 locked in closed position by pins 58 and the swinging gates 32 closed by their springs 65, and a thoroughly wet mixture of the plastic material maintained in trough 5 by continuous turning of rim 70. Operating levers 90 and 91 for the actuating means 17 and 40 are in neutral position closing the valves 16, 16ª, 39 and 39ª, and operating levers 92 and 93 for the actuating means 84 and 88 are also shifted so as to close valves 83, 83ª and 87.

By shifting lever 90, valve 16 is opened to permit passage of the motive fluid from supply pipe 18 through conduit 15, and at the same time valve 16ª is opened for discharge from conduit 15ª to the atmosphere, the pressure of the motive fluid under piston 12 thereby elevating the mold box until it abuts against the lower ends of walls 30 and the base of trough 5, in position to receive the plastic material. When the mold box reaches this position the cam fingers 62 release pins 58 so that gates 31 are opened by their springs 55, and the elevation of gates 31 opens swinging gates 32 by the cams 67 engaging arms 66. The swinging gates are so arranged with relation to the direction of turning of rim 70 as to direct the circumferentially moving plastic material through the open gates as shown in dotted lines in Fig. 3, so that the wet mixture moves along chutes 33 and past open gates 31 into the enclosing mold box.

When the mold box and the overlying enclosed space formed by walls 30 having been filled with the wet plastic mixture, the lever 91 is shifted to permit the motive fluid to enter conduit 38 and open conduit 38ª to the atmosphere thereby lowering pressure plate 6 for closing gates 31 through their engagement by fingers 56 and also permitting closing of gates 32 as the cams 67 disengage arms 66.

Preferably at this point lever 93 is shifted so as to open valve 87 and create a vacuum in chamber 50, and this vacuum causes suction through apertures 46 for filtering out fluid such as air and water from the wet plastic material which is enclosed in the mold, so that during further downward movement of plate 6 it may readily compress the plastic mixture, with the material in the enclosed space formed by walls 30 utilized to completely fill the mold.

Resistance to the pressure application of plate 6 is materially reduced by the withdrawal of fluid from the plastic material, and the construction of the mold box whereby it confines the mass of plastic material on all sides insures the pressure being transmitted equally and the suction being equally applied for uniformly settling and uniting the aggregate. The suction being applied equally throughout the entire plastic mass, certain of the fined solid particles which will pass through the filter 46 will be withdrawn with the water so as to insure formation of a block of the desired uniform density, and the water together with any solid material which is not arrested by the filter is withdrawn past check valve 48 which prevents its subsequent return flow, and is then drawn through pipe 49 into the chamber 50 where it is trapped.

When the pressure plate has been lowered so as to meet the top of the mold box, thereby completing formation of the plastic block in the mold, the lever 93 is reversely shifted so as to close valve 87, and during subsequent removal of the block from the mold, the lever 92 is shifted so as to open valves 83—83$^a$ and thereby permit the liquid trapped in chamber 50, together with any solid ingredients mixed with the liquid, to return to hopper 77 so that none of the plastic material is lost. To remove the block from the mold, levers 90 and 91 are reversely shifted to permit exhaust through conduits 15 and 38 and supply motive fluid through conduits 15$^a$ and 38$^a$, thereby elevating the pressure plate and lowering the mold box, with the gates 31 and 32 remaining closed as a result of the pins 58 re-engaging the notches 59.

Lowering of the mold box strips it from the plastic block, since the block remains in elevated position supported on the tilting plate 21 which is in turn supported on the stationary false bottom 20. The plate 21 is then tilted at its hinged connection 22 so as to slide the plastic block clear of the machine and onto a suitable conveyor or the like for its removal to a place of storage, the tilting of plate 21 being preferably accomplished by means of depending rods 100 pivoted to the plate as shown at 101, and adapted for operative movement by lowering of the mold box. As an instance of this arrangement rods 100 may be pivoted to rocker arms 102 which are fulcrumed on the base of frame 1 as shown at 103, the rocker arms being adapted for engagement by the bottom of the mold box as the latter moves to fully lowered position, in order to swing the rocker arms and thereby tilt plate 21, and as soon the mold box is again elevated for repeating the molding operation, its release of the rocker arms permit gravity return of the tilting plate to normal position resting on false bottom 20 and adapted to form the base of the mold.

It will be noted that operation of the apparatus as thus described provides a convenient means whereby a plastic mixture thoroughly wet may be supplied directly to the mold, the use of thoroughly wet material rather than a semi-dry mixture in conjunction with the withdrawal of fluid from the wet mixture so as to eliminate resistance to the pressure application, insuring a proper distribution of the aggregate in the molded blocks and the consequent formation of blocks of the desired consistency and strength; and movement of the mold toward and away from the mixing trough not only permits direct discharge of the wet mixture into the mold but also provides for conveniently withdrawing the molded blocks. The relation of the parts and their cooperative action also permits speed of operation and a simplified control resulting in maximum production.

The suction created through apertures 46 eliminates resistance to proper compression of the aggregate such as would otherwise be caused by the fluids forming a part of the wet plastic mass, and the resulting plastic mixture may thereby be readily compressed by plate 6 with little effort. Extraction of the liquids from the plastic blocks by means of suction also causes the plastic material to set practically instantaneously and thereby immediately forms rigid blocks which may be withdrawn from the mold without waiting for the relatively slow process of liquid evaporation; and the return to the mixing trough of the filtered liquids together with any particles of solid material carried thereby, provides for re-use of such liquid and solid materials in making the wet plastic material, and thereby eliminates loss or waste of any of the ingredients of the aggregate.

The proper quantity of the wet plastic mixture supplied to the mold for forming each block, is accurately regulated by the spaced relation of pressure plate 6 and mold box 4 when these parts are at their limit of elevation ready for discharge of the plastic material into the mold, the enclosed space formed by walls 30 between the spaced pressure plate and mold box containing just the proper quantity of the wet plastic mixture to compress the aggregate in the mold box to the desired degree when the entire measured quantity of material has been forced into the mold by the lowering of the pressure plate until its engages the top of the mold box.

Vertical movement of the mold box with relation to a fixed base adapted to form the bottom of the mold also provides for convenient withdrawal of the molded block and the immediate re-use of the mold box in the manufacture of another block, since by supporting the molded block on the stationary base and lowering the mold box relative thereto the mold is automatically stripped from the block so as to leave it exposed for ready removal; and the automatic tilting action of the supporting base when the mold box has been stripped from the block insures immediate displacement of the block so that it moves clear of the apparatus.

I claim:

1. Apparatus of the character described comprising a mixing trough and a mold box adapted for movement in opposite directions relative to the mixing trough; the respective opposite movements of the mold box adapting it to receive plastic material from the mixing trough, and for convenient removal of the molded product from the mold box.

2. Apparatus of the character described comprising a mixing trough, a mold box adapted for movement relative to the mixing trough, closure means between the mixing trough and the mold box, and means for opening said closure means by movement of the mold box to a position adapting it to receive the material discharged from the mixing trough.

3. Apparatus of the character described comprising a mixing trough, a chute leading from the mixing trough, a gate between the trough and chute, a mold box adapted for movement relative to the chute, closure means between the chute and the mold box, means for opening the gate when the closure means is opened, means for opening the closure means by movement of the mold box to a position adapting it to receive the material discharged from the chute, and means for closing the gate when the closure means is closed.

4. Apparatus of the character described comprising means for supplying a plastic mixture, a mold box adapted for movement to a position for receiving said plastic mixture, closure means for the supply means, means for opening the closure means by said movement of the mold box, means movable relative to the mold box for compressing the plastic mixture, and means for closing the closure means by said movement of the compression means.

5. Apparatus of the character described comprising means for supplying a plastic mixture, a mold box adapted for movement relative to the supply means, means for opening the supply means to the mold by movement of the mold box to a position adjacent the supply means and means actuated by opposite movement of the mold box for stripping the mold box from the plastic block formed therein.

6. Apparatus of the character described comprising means for supplying a plastic mixture, a mold box adapted for movement relative to the supply means, means for opening the supply means to the mold by movement of the mold box to a position adjacent the supply means, means for compressing the plastic mixture discharged into the mold box, means actuated by said compression means for closing the supply means to the mold box, and means actuated by opposite movement of the mold box for stripping the mold box from the plastic block formed therein.

7. Apparatus of the character described comprising means for supplying a plastic mixture, a mold box adapted for movement relative to the supply means, means for opening the supply means to the mold by movement of the mold box to a position adjacent the supply means, means for compressing the plastic mixture discharged into the mold box, suction means for withdrawing liquid from the plastic mixture in the mold box, means actuated by the compression means for closing the supply means to the mold box, and means actuated by opposite movement of the mold box for stripping the mold box from the plastic block formed therein.

8. Apparatus of the character described comprising an annular mixing trough, a pair of transversely spaced parallel walls in the central opening defined by said annular trough, closure means connecting the ends of said parallel walls, means for supplying a plastic mixture from the mixing trough to the enclosed space defined by said parallel walls when said closure means are opened, and a mold box adapted for movement to a position open to and forming a continuation of said enclosed space.

9. Apparatus of the character described comprising a mixing trough, a movable mold box, and a stationary false bottom for the movable mold box, said movable mold box being adapted for movement in opposite directions relative to the false bottom and the mixing trough, said movement of the mold box in one direction being adapted to define a mold having the false bottom as its base and so position the mold as to receive plastic material from the mixing trough, and movement of the mold box in the opposite direction being adapted to strip the box from the molded product supported by the false bottom.

10. Apparatus of the character described comprising a tiltable false bottom and a mold box movable in opposite directions relative to the false bottom, the respective opposite movements of the mold box defining a mold having the false bottom as its base, and removing the mold box from said base so as to leave the molded product supported on the false bottom whereby tilting said false bottom will displace the molded product.

11. Apparatus of the character described comprising a mixing trough, a mold box adapted to receive wet plastic material from the mixing trough, cooperating filtering and suction creating means for withdrawing from the plastic material in the mold box liquid and such finer particles of solid material as will pass through the filtering means, and means for returning said liquid and particles of solid material to the mixing trough.

12. Apparatus of the character described comprising a mold box, cores in the mold box, a pressure plate movable relative to the mold box, cores on the pressure plate in alinement with and adapted for end abutment against the cores in the mold box, and yieldable means projecting the cores on the pressure plate into engagement with the cores in the mold box, said projecting means being adapted to yield for retraction of the cores on the pressure plate when the pressure plate is moved toward the mold box.

13. Apparatus of the character described comprising a mold box adapted to receive wet plastic material, a pressure plate movable relative to the plastic material in the mold box for compressing the plastic material, and a suction means on the pressure plate for withdrawing fluid from said wet plastic material during compressing movement of the pressure plate.

In testimony whereof he has affixed his signature to this specification.

GEORGE C. DEBAY.